United States Patent [19]

Mojden et al.

[11] Patent Number: 5,449,060
[45] Date of Patent: Sep. 12, 1995

[54] DISCHARGE APPARATUS FOR ARTICLE HANDLING SYSTEM

[75] Inventors: Andrew E. Mojden, Hinsdale; Richard P. Hoinacki, Oak Lawn, both of Ill.

[73] Assignee: Fleetwood Systems, Inc., Romeoville, Ill.

[21] Appl. No.: 10,747

[22] Filed: Jan. 29, 1993

[51] Int. Cl.$^6$ ............................................. B65B 35/40
[52] U.S. Cl. ............................. 198/419.1; 198/621.1; 198/746; 198/747
[58] Field of Search .................... 198/468.11, 744, 746, 198/747, 621, 419.1; 414/798.4, 798.7

[56] References Cited

U.S. PATENT DOCUMENTS

| | | | |
|---|---|---|---|
| 2,729,151 | 1/1956 | Evers | 414/798.7 |
| 4,979,870 | 12/1990 | Mojden et al. | 414/788.4 |
| 5,119,617 | 6/1992 | Mojden et al. | 53/500 |

FOREIGN PATENT DOCUMENTS 3335583  4/1985  Germany ............... 198/744

Primary Examiner—Michael S. Huppert
Assistant Examiner—Janice L. Krizek
Attorney, Agent, or Firm—Trexler, Bushnell, Giangiorgi & Blackstone, Ltd.

[57] ABSTRACT

A discharge apparatus for an article handling system receives a group of articles in a facewise stacked condition and delivers the group of articles to an outfeed apparatus wherein the articles are arranged in a continuous flow. The discharge apparatus comprises a first stage station wherein groups of articles are received; an elongate discharge station having an incoming end and an outgoing end, the outgoing end being adjacent an outfeed apparatus, and the incoming end being spaced apart from the first stage station. An article carrying lane extends from the first stage station through the discharge station. A shuttle is bidirectionally movable between the first stage station and the discharge station for transporting a group of articles along the article carrying lane from the first stage station to the discharge station and returning to the first stage station to receive a subsequent group of articles. A discharge carriage is bidirectionally movable between the incoming end and the outgoing end of the discharge station for advancing articles along the article carrying lane to the outfeed apparatus in a continuous flow. Operating control operates the shuttle to transport a leading end of a group of articles into engagement with a trailing end of articles previously transported to the discharge station to make up a continuous flow of articles in the discharge station and thereafter operates the discharge carriage for advancing the articles toward the outgoing end of the discharge station.

12 Claims, 2 Drawing Sheets

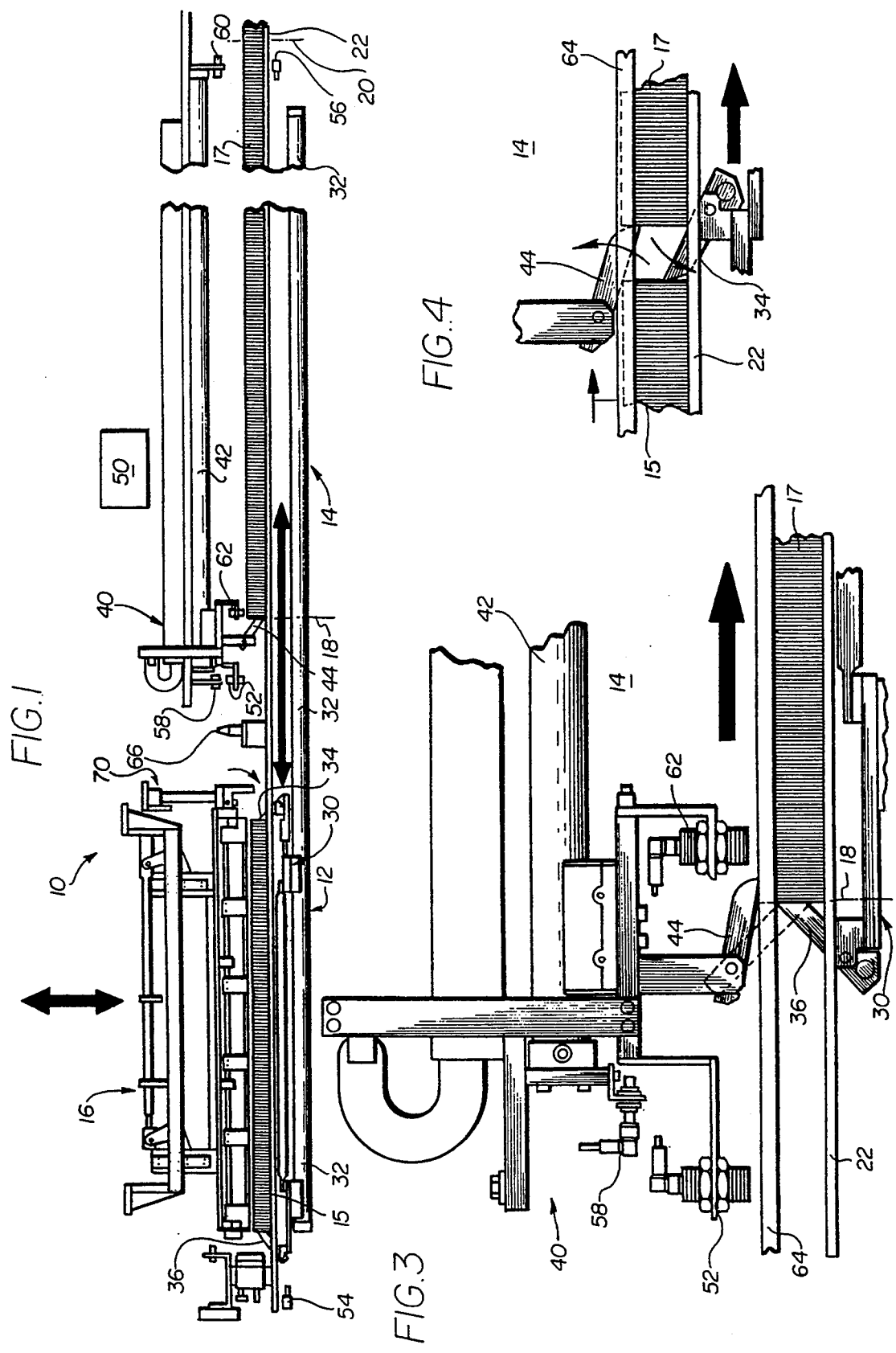

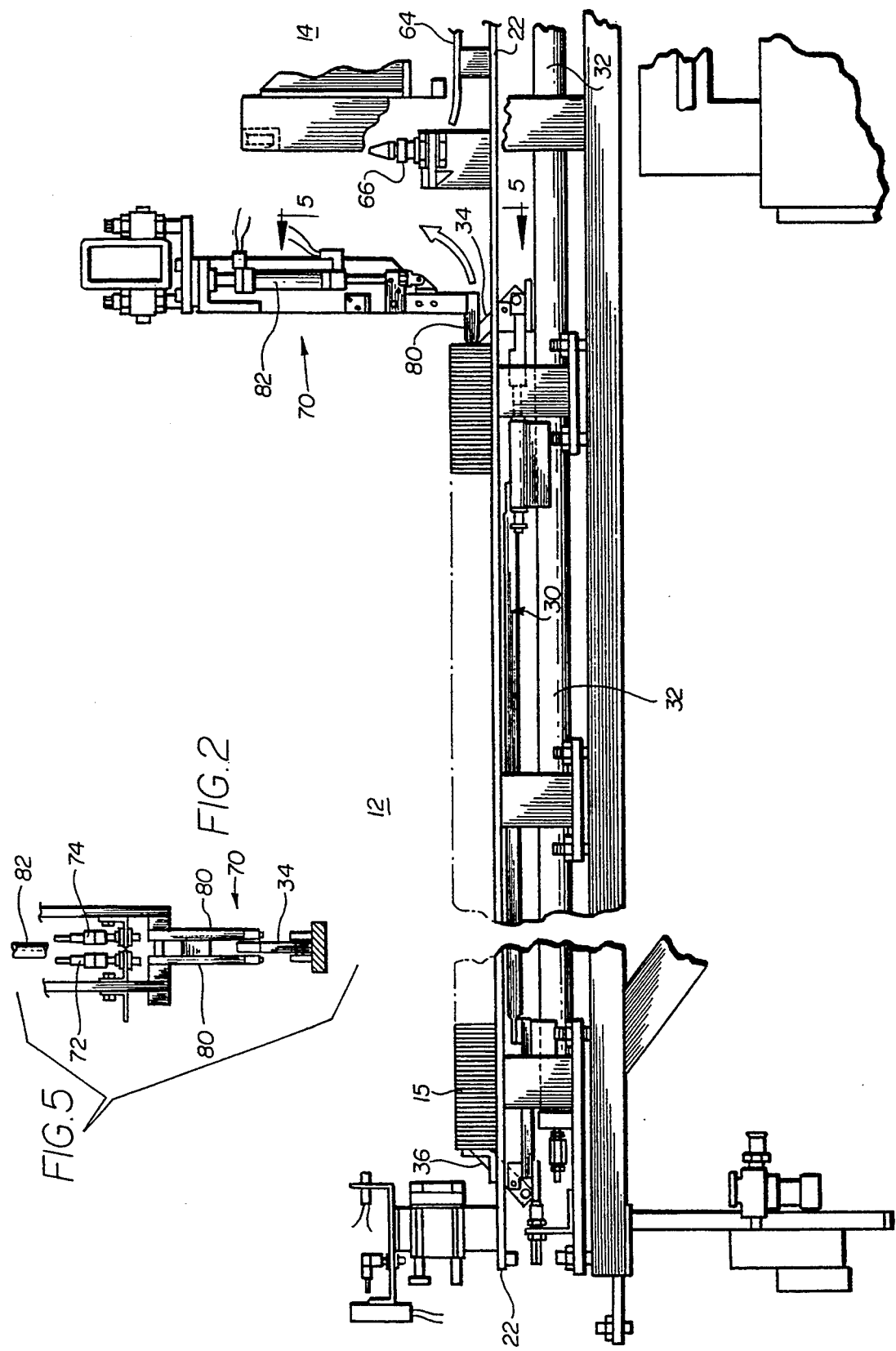

DISCHARGE APPARATUS FOR ARTICLE HANDLING SYSTEM

BACKGROUND OF THE INVENTION

The present invention is concerned generally with article handling systems and in particular with a novel and improved discharge apparatus for an article handling system.

While the invention may find utility in other applications, the invention will be particularly described herein with reference to an article handling system of the type illustrated and described in U.S. Pat. No. 4,979,870 entitled "AUTOMATIC TRAY LOADING, UNLOADING AND STORAGE SYSTEM" which patent is commonly owned herewith. This patent illustrates and describes a system for loading articles such as can ends which are supplied from a first location in a facewise nested condition into trays and thereafter unloading these articles from the trays for transport to a second location. This system is designed to compensate for differences in the rate at which articles are supplied from the first location and the rate of demand for the articles at the second location, such that previously stored articles may be removed from one or more trays to make up for an increase in the demand or decrease in the supply, and on the other hand articles may be stored in trays to compensate for either a decrease in the demand or an increase in the supply.

The present invention will be illustrated and described with particular reference to the problem of handling can ends or similar facewise nested articles in such a system. In the manufacture of containers such as beverage cans or the like, a great number of can ends are required. Generally speaking, container bodies require but a single end closure piece. Moreover, in may applications the so-called "flip-top" or "pop-top" containers are utilized, which requires that the can end be fabricated with suitable prescorings and pull rings to define tear-away openings.

Thus while the can ends are generally nestable in a generally flat coaxial facewise arrangement, the tabs or rings may tend to cause the can ends to push apart and tilt somewhat out of the desired coaxial position. It is therefore important that handling apparatus and methods take account of this tendency, and provide sufficient axial support to overcome it.

In commercial scale operations, many thousands of such can ends must be handled and preferably automatically fed or delivered between various points in either end fabrication operations or in packaging operations wherein they are assembled with filled containers. It has heretofore become the practice to handle can ends in individual groups of a preselected length, which thereby also contain a reasonably accurate and predictable count of can ends or like articles. In the fabrication operation, it is necessary to deliver the ends from an initial press which forms the ends to subsequent stations wherein the pull tabs and scoring are applied, various coatings, etc. are applied, and the like to produce the finished end. Finally the ends are separated into groups of predetermined lengths, generally referred to as "sticks" in the art, and these sticks are often packaged in kraft paper bags for subsequent storage or transport.

In the system of the above-referenced U.S. Pat. No. 4,979,870, the loading, unloading and storage system or compensating system is generally placed between operations in the can end fabrication process. In such a process, the ends are generally fed in a continuous flow over suitable infeed/outfeed lanes from one station to the next. In order to handle the cans in the system of the above-mentioned patent, it is necessary that the incoming continuous flow be initially separated into individual groups for handling and placement with respect to the trays. By the same token, it is necessary upon removal of ends from the trays for delivery, in accordance with demand, to downstream fabricating operations, that the individual groups or sticks of ends be again fed into suitable lanes in a continuous flow.

The present invention provides a novel and improved discharge apparatus for delivering individual groups of ends to an outfeed area and, in so doing to reunite the individual groups of ends to form a continuous flow of articles as they enter an outfeed lane.

OBJECTS AND SUMMARY OF THE INVENTION

It is a general object of this invention to provide a novel and improved discharge apparatus for an article handling system for receiving individual groups of articles in a facewise stacked condition and delivering the groups of articles to an outfeed as a continuous flow.

Briefly, and in accordance with the foregoing, the present invention provides a discharge apparatus for an article handling system, said discharge apparatus receiving a group of articles in a facewise stacked condition and delivering said group of articles to an outfeed apparatus wherein the articles are arranged in a continuous flow, said discharge apparatus comprising: a first stage station wherein said groups of articles are received; an elongate discharge station having an incoming end and an outgoing end, said outgoing end being adjacent an outfeed apparatus, said incoming end being spaced apart from said first stage station; an article carrying lane extending from said first stage station through said discharge station; shuttle means bidirectionally movable between said first stage station and said discharge station for transporting a group of articles along said article carrying lane from said first stage station to said discharge station and returning to said first stage station to receive a subsequent group of articles; discharge carriage means bidirectionally movable between said incoming end and said outgoing end of said discharge station for advancing articles along said article carrying lane to said outfeed apparatus in a continuous flow; and operating means associated with said shuttle means and with said discharge carriage means respectively for operating said shuttle means to transport a leading end of a group of articles into engagement with a trailing end of articles previously transported to said discharge station to make up a continuous flow of articles in said discharge station and for thereafter operating said discharge carriage for advancing said articles toward said outgoing end of said discharge station.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a side elevation, somewhat diagrammatic in form, and partially broken away, of a discharge apparatus in accordance with the invention;

FIG. 2 is an enlarged side elevation of a first stage station portion of the apparatus of FIG. 1;

FIG. 3 is an enlarged side elevation of a discharge station portion of the apparatus of FIG. 1.

FIG. 4 is a side elevation similar to FIG. 3, showing initial engagement of a leading end of a group of articles with a trailing end of a flow of articles in a discharge station; and FIG. 5 is an elevation taken generally along the line 5—5 of FIG. 2.

DETAILED DESCRIPTION OF THE ILLUSTRATED EMBODIMENT

Referring now to FIGS. 1-3 of the drawings, a discharge apparatus for an article handling system is indicated generally by the reference numeral 10. The discharge apparatus 10 generally receives a group 15 of articles in a facewise nested or stacked condition, the group of articles being of a predetermined length. In the embodiment illustrated for purposes of description, the articles of the group 15 comprise can ends; however, the invention may find utility in connection with the handling of other, similar articles.

The discharge apparatus is arranged for receiving the groups 15 of articles of a predetermined length and delivering these groups of articles to an outfeed apparatus (not shown) wherein the articles are arranged in a continuous flow. Accordingly, the discharge apparatus of the invention receives successive groups of articles at a first stage station 12 and delivers these articles to a discharge station 14 whereat the individual groups of articles are joined together to define a continuous flow 17 of articles out of the discharge station 14 and to an outfeed apparatus (not shown) which immediately follows the discharge station 14.

In the illustrated embodiment, the groups 15 of articles are delivered to the first stage station 12 by a pick-and-place device which is a part of an article handling system of the type illustrated and described in U.S. Pat. No. 4,979,870, which patent is commonly owned herewith. Preferably, the pick-and-place device 16 is of the same construction as that illustrated and described in our co-pending application, Ser. No. 08/011,381, filed Jan. 29, 1993, and entitled "Infeed Apparatus for Article Handling System," and hence may not be further described herein. Suffice it to say that the pick-and-place device or apparatus 16 moves vertically upwardly and downwardly relative to the first stage station 12 for depositing successive groups 15 of articles therein, in accordance with a predetermined sequence of operation. This sequence of operation is such that a group 15 of articles is delivered to the first stage station 12 only when the previous group of articles has been fully removed therefrom, in a manner to be described hereinbelow.

Generally speaking, discharge station 14 has an incoming end 18 and an outgoing end 20. The incoming end is spaced apart from the first stage station and an article-carrying lane 22, preferably comprised of a pair of rails, along which articles such as can ends in a stacked condition can be slidably transported, extends through the entire discharge apparatus from and including the first stage station 12 through and including the discharge station 14. A shuttle means or apparatus 30 is bidirectionally moveable between the first stage station 12 and the discharge station 14 for transporting the groups 15 of articles along the article carrying lane 22 from the first stage station 12 to the discharge station 14 and for returning to the first stage station 12 to receive a subsequent group of articles.

A discharge carriage means or apparatus 40 is bidirectionally moveable between the incoming end 18 and outgoing end 20 of the discharge station for advancing articles along the article carrying lane 22 to an outfeed apparatus (not shown) in a continuous flow as indicated by reference numeral 17.

Operating means including a controller or control means 50 (shown diagrammatically), a plurality of sensors or sensor means, and drive means to be described hereinbelow, are associated with the shuttle means 30 and discharge carriage means 40. The operating means cause a leading end of a group of articles 15 transported by the shuttle means 12 to engage a trailing end of articles previously transported to the discharge station 14 to make up a continuous flow 17 of articles in the discharge station, and for thereafter advancing these articles toward the outgoing end 20 of the discharge station. The controller or control means 50 is arranged for controlling a predetermined sequence of operation comprising initially retaining the shuttle means 30 in the first stage station 12 to receive a group 15 of articles, and then moving the shuttle means in the direction of the discharge station 14 until a leading end of the group 15 of articles contacts a trailing end of the flow of articles in the discharge station. Thereupon, the control means causes the shuttle means to be returned to the first stage station to receive a subsequent group of articles, and also causes the discharge carriage means 40 to advance the articles toward the outgoing end 20 of the discharge station.

The operating means include drive means in the form of a pair of elongate linear actuators 32 and 42 for respectively propelling the shuttle means 30 and the discharge carrier 40 in their above-described bidirectional motions. These drive means 32 and 42 preferably comprise elongate linear actuators, which may be of the type described in the above-referenced U.S. Pat. No. 4,979,870 or of any other appropriate type for achieving the above-described motion. Preferably, the linear actuators operate at a speed such that the shuttle means 30 is propelled between the first stage station 12 and the discharge station 14 at a rate of travel at least as great as a rate of travel at which the linear actuator 42 moves the discharge carriage 40 toward the outgoing end 20 of the discharge station. Preferably, the rate of movement of the shuttle means 30 is initially somewhat greater than the rate of travel of the discharge carriage 40, such that a leading end of the group 15 of articles can overtake and engage a trailing end of the flow of articles 17 somewhere along the length of discharge station 14.

In this regard, the shuttle means includes a leading end support member 34 and trailing end support member 36 for respectively supporting leading and trailing ends of the group 15 of articles. Similarly, the discharge carriage means 14 includes an article engaging means 44 which is similar in structure to the leading end and trailing end support members 34 and 36. As best viewed in FIG. 3, the article engaging means 44 and the trailing end support member 36 are cooperatively configured and located such that both can simultaneously engage a trailing end of the group 15 of articles when the trailing end reaches the incoming end 18 of the discharge station 14. This permits a group 15 of articles to be delivered to the discharge station 14 by the discharge shuttle 12 while the discharge carriage 40 is advancing the continuous flow of articles toward the outgoing end 20 of the discharge station 14. When the leading end of the group 15 of articles reaches the trailing end of the flow 17 of articles in the discharge station, the articles are merged together in a continuous flow, and thereupon the article engaging means 44 can return to engage and advance the trailing end of the group 15 of articles which has just been merged into the flow 17 and hence becomes the trailing end of flow 17 of articles. At this time, the shuttle 30 can return to the first stage station 12 to receive a subsequent group of articles.

Additionally, each of the leading and trailing end support members 34, 36 as well as the discharge carriage article engaging means 44 are spring-loaded and pivotally mounted. Each of these members is mounted at an angle relative to the articles and is moveable out of engagement with the articles upon either engaging or being engaged by approaching articles in the article carrying lane 22. As best viewed in FIG. 4, for example, as the shuttle means 30 advances relative to the flow 17 of articles, the leading end support member 34 will fold downwardly and out of the article carrying lane 22 as it encounters the trailing edge of the flow 17 of articles. The support member 34 will thus ride under the flow 17 of articles without interference therewith until it reaches the outgoing end 20 of the discharge station. Similarly, the article engaging member 44 is angled and spring-loaded such that it is pushed upwardly and out of engagement with the trailing end of the flow 17 of articles by the leading end of the group 15 of articles, substantially simultaneously with the leading end support member 34 being pivoted out of engagement by the leading end of the flow 17 of articles. It is at this point, somewhere along the length of the discharge station 14, that the group of articles 15 is effectively merged with the outgoing flow 17 of articles.

In similar fashion, the trailing support member 36 is pivoted downwardly and out of the article carrying lane 22 by a leading end of a group 15 of articles in the first stage station 12 during return of the shuttle 30 to receive a subsequent group of articles. Thus, the trailing end support member 36 effectively rides under the group 15 of articles in the first stage station 12, without disturbing the same, as it returns to the first stage station 12.

As mentioned hereinabove the operating means include a number of sensors or sensor means. These include a new stack sensor means 52 which is mounted on the discharge carriage 40 for movement together with the article engaging means 44. The sensor 52 produces a new stack signal in response to the arrival of a leading end of a group 15 of articles transported by the shuttle means 30 at the position of the sensor 52. The control means 50 is responsive to the new stack signal for causing the drive means 32 to reduce the rate of travel of the shuttle means 30 and for causing the drive means 42 to halt the travel of the discharge carriage means 40. In this way, the leading end of the group 15 of articles is slowed somewhat as it approaches engagement with the trailing end of the flow 17 of articles, the latter having been stopped when movement of the discharge carriage means is halted. This permits the articles to be combined without excessive forces of engagement therebetween. Preferably, the sensor 52 is a proximity-type sensor.

Additional sensors 54, 56 detect the opposite extremes of the positions of the shuttle means 30 and provide corresponding control signals for use by the control means 50 for controlling the sequence of operation of the discharge apparatus 10 as described hereinabove. Similarly, respective sensors 58 and 60 detect the opposite extremes of movement of the discharge carriage 40 and produce similar control signals for use by the controller or control means 50 for controlling the sequence of operation of the discharge apparatus 10. Preferably each of the above-described sensors 54, 56, 58 and 60 comprise proximity-type sensors. A similar proximity sensor 62 rides with the discharge carriage. Preferably a pair of hold down rods or tracks, one of which is designated by reference numeral 64 (not shown in FIG. 1), are provided along the length of the discharge station 14 for additionally supporting the articles 15 as they are advanced by the article engaging means or member 44.

A stick clear sensor 66, also preferably a proximity type sensor, is placed somewhat ahead of the incoming end 18 of the discharge station 14. This sensor 66 detects the passage of a trailing end of a group 15 of articles carried by the shuttle 30 and produces a signal for permitting a new group of articles to be deposited in the first stage station 12 by the pick-and-place device 16.

The discharge apparatus 10 also preferably includes a leading end hold up means or assembly 70 for engaging and supporting a leading end of a group 15 of articles in the first stage station prior to the return of the shuttle means 30 to the first stage station to receive the group of articles, that is, while the shuttle 30 is delivering articles to the discharge station 14. Preferably, the leading end hold up means 70 and the shuttle's leading end support member 34 are cooperatively configured and located such that both may simultaneously engage and support the leading end of a group 15 of articles in the first stage station 12, such that the shuttle 30 can return to the first stage station 12 and the leading end support member 34 can engage the leading end of the articles, before withdrawal of the leading end hold up means 70. Additional proximity sensors 72, 74 (see FIG. 5) are provided for sensing the position of the leading end hold up means 70, that is, either in engagement with, or out of engagement with the leading end of a group of articles in the first stage station 12. Preferably, the leading end hold up means comprises a pair of spaced parallel article engaging members 80 which are pivotally mounted and actuated by means of a piston-and-cylinder assembly 82 to swing into and out of a position for engagement with a leading end of articles in the first stage station 12. As best viewed in FIG. 5, the article engaging members 80 are spaced such that the article support member 34 can advance between these two members 80 to engage and support the leading end of the articles simultaneously therewith and prior to the withdrawal thereof by the piston and cylinder 82.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A discharge apparatus for an article handling system, said discharge apparatus receiving a group of articles in a facewise stacked condition and delivering said group of articles to an outfeed apparatus wherein the articles are arranged in a continuous flow, said discharge apparatus comprising: a first stage station wherein a group of articles is received; an elongate discharge station having an incoming end and an outgoing end, said outgoing end being adjacent said outfeed apparatus, said incoming end being spaced apart from said first stage station; an article carrying lane extending from said first stage station through said discharge station; shuttle means bidirectionally movable between said first stage station and said discharge station for transporting said group of articles along said article carrying lane from said first stage station to said discharge station and for returning to said first stage station to receive a subsequent group of articles; discharge carriage means bidirectionally movable between said incoming end and said outgoing end of said discharge station for advancing articles along said article carrying lane to said outfeed apparatus in a continuous flow; and operating means associated with said shuttle means and with said discharge carriage means respectively for operating said shuttle means to transport a leading end of a group of articles into engagement with a trailing end of articles previously transported to said discharge station to make up a continuous flow of articles in said discharge station and for thereafter operating said discharge carriage means for advancing said articles toward said outgoing end of said discharge station; wherein said shuttle means includes a leading end support member and a trailing end support member for respectively supporting leading and trailing ends of said group of articles; wherein said discharge carriage means includes article engaging means and wherein said trailing end support member and said article engaging means are cooperatively configured and located such that both can simultaneously engage a trailing end of said group of articles at said discharge station.

2. Apparatus according to claim 1 wherein said leading end support member and said discharge carriage article engaging means are spring-loaded and pivotally mounted, said leading end support member being pivoted out of engagement with said leading end of said group of articles by a trailing end of articles in said discharge station and said discharge carriage article engaging means being pivoted out of engagement with a trailing end of articles in said discharge station by a leading end of said group of articles carried by said shuttle mean substantially simultaneously with said pivoting out of engagement of said leading end support member, for causing said leading end of said group of articles to engage the trailing end of the articles in said discharge station in response to further movement of said shuttle means into said discharge station.

3. Apparatus according to claim 1 wherein said article engaging means of said discharge carriage means is spring-loaded and pivotally mounted for retracting to ride freely over articles in said discharge station for return of said discharge carriage means to said incoming end of the discharge station and for projecting to engage a trailing end of a group of articles when said trailing end reaches said incoming end of said discharge station.

4. Apparatus according to claim 1 and further including leading end holdup means for engaging and supporting a leading end of a group of articles in said first stage station during return of said shuttle means to said first stage station to receive a group of articles.

5. Apparatus according to claim 4 wherein said leading end holdup means and said trailing end support member are cooperatively configured and located such that both may simultaneously engage and support a leading end of a group of articles in said first stage station.

6. Apparatus according to claim 5 wherein said leading end support member of said shuttle means is spring-loaded and pivotally mounted for riding under a group of articles in said first stage station during return of said shuttle means to said first stage station to receive said group of articles.

7. Apparatus according to claim 4 wherein said operating means includes a stack clear sensor located between said first stage station and said discharge station for producing a stack clear signal in response to the passage of a trailing end of a group of articles being transported by said shuttle means, and control means responsive to said stack clear signal for activating said leading end holdup means to move into a position for engaging a leading end of a subsequent stack of articles delivered to said first stage station.

8. A discharge apparatus for an article handling system, said discharge apparatus receiving a group of articles in a facewise stacked condition and delivering said group of articles to an outfeed apparatus wherein the articles are arranged in a continuous flow, said discharge apparatus comprising: a first stage station wherein a group of articles is received; an elongate discharge station having an incoming end and an outgoing end, said outgoing end being adjacent said outfeed apparatus, said incoming end being spaced apart from said first stage station; an article carrying lane extending from said first stage station through said discharge station; shuttle means bidirectionally movable between said first stage station and said discharge station for transporting said group of articles along said article carrying lane from said first stage station to said discharge station and for returning to said first stage station to receive a subsequent group of articles; discharge carriage means bidirectionally movable between said incoming end and said outgoing end of said discharge station for advancing articles along said article carrying lane to said outfeed apparatus in a continuous flow; and operating means associated with said shuttle means and with said discharge carriage means respectively for operating said shuttle means to transport a leading end of a group of articles into engagement with a trailing end of articles previously transported to said discharge station to make up a continuous flow of articles in said discharge station and for thereafter operating said discharge carriage means for advancing said articles toward said outgoing end of said discharge station; wherein said shuttle means includes a leading end support member and a trailing end support member for respectively supporting leading and trailing ends of said group of articles; and further including leading end holdup means for engaging and supporting a leading end of a group of articles in said first stage station until return of said shuttle means to said first stage station to receive a group of articles.

9. Apparatus according to claim 8 wherein said leading end holdup means and said leading end support member are cooperatively configured and located such that both may simultaneously engage and support a leading end of a group of articles in said first stage station.

10. Apparatus according to claim 9 wherein said leading end support member of said shuttle means is spring-loaded and pivotally mounted for riding under a group of articles in said first stage station during return of said shuttle to said first stage station to receive said group of articles.

11. Apparatus according to claim 9 wherein said operating means includes a stack clear sensor located between said first stage station and said discharge station for producing a stack clear signal in response to the passage of a trailing end of a group of articles being transported by said shuttle means, and control means responsive to said stack clear signal for activating said leading end holdup means to move into a position for engaging a leading end of a subsequent stack of articles delivered to said first stage station.

12. A discharge apparatus for an article handling system, said discharge apparatus receiving a group of articles in a facewise stacked condition and delivering said group of articles to an outfeed apparatus wherein the articles are arranged in a continuous flow, said discharge apparatus comprising: a first stage station wherein a group of articles is received; an elongate discharge station having an incoming end and an outgoing end, said outgoing end being adjacent said outfeed apparatus, said incoming end being spaced apart from said first stage station; an article carrying lane extending from said first stage station through said discharge station; shuttle means bidirectionally movable between said first stage station and said discharge station for transporting said group of articles along said article carrying lane from said first stage station to said discharge station and for returning to said first stage station to receive a subsequent group of articles; discharge carriage means bidirectionally movable between said incoming end and said outgoing end of said discharge station for advancing articles along said article carrying lane to said outfeed apparatus in a continuous flow; and operating means associated with said shuttle means and with said discharge carriage means respectively for operating said shuttle means to transport a leading end of a group of articles into engagement with a trailing end of articles previously transported to said discharge station to make up a continuous flow of articles in said discharge station and for thereafter operating said discharge carriage means for advancing said articles toward said outgoing end of said discharge station; wherein said operating means include control means for controlling a predetermined sequence of operation of said discharge apparatus comprising retaining said shuttle means in said first stage station to receive a group of articles, moving said shuttle means in the direction of said discharge station until a leading end of said group of articles contacts a trailing end of articles in said discharge station, moving said discharge carriage into engagement with a trailing end of said group of articles delivered by said shuttle means, returning said shuttle means to said first stage station to receive a subsequent group of articles, and moving said discharge carriage toward the outgoing end of said discharge station; wherein said operating means further includes a home position sensor for producing a home signal in response to the return of said discharge carriage to the incoming end of said discharge station, and wherein said control means are responsive to said home signal for causing said shuttle means to return to said first stage station to receive a subsequent group of articles.

* * * * *